United States Patent
Haruta et al.

(10) Patent No.: US 8,722,161 B2
(45) Date of Patent: May 13, 2014

(54) HEAT SHRINKABLE POLYESTER FILM, METHOD FOR PRODUCING SAME, AND PACKAGED BODY

(75) Inventors: Masayuki Haruta, Tsuruga (JP); Yukinobu Mukoyama, Tsuruga (JP); Katsuya Ito, Tsuruga (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 13/639,741

(22) PCT Filed: Mar. 16, 2011

(86) PCT No.: PCT/JP2011/056163
§ 371 (c)(1),
(2), (4) Date: Oct. 5, 2012

(87) PCT Pub. No.: WO2011/125435
PCT Pub. Date: Oct. 13, 2011

(65) Prior Publication Data
US 2013/0034673 A1 Feb. 7, 2013

(30) Foreign Application Priority Data
Apr. 8, 2010 (JP) .................................. 2010-089346

(51) Int. Cl.
B32B 1/02 (2006.01)
C08G 63/00 (2006.01)
B29C 71/00 (2006.01)
B29C 55/00 (2006.01)

(52) U.S. Cl.
USPC ....... 428/34.9; 428/35.1; 428/35.2; 428/35.5; 428/35.7; 525/444; 528/308.1; 264/235.8; 264/237; 264/290.2; 264/348

(58) Field of Classification Search
USPC ........... 428/34.1, 34.9, 35.1, 35.2, 35.5, 35.7, 428/36.6, 36.9, 36.91, 36.92; 525/444; 528/308.1; 264/235.8, 237, 290.2, 348
See application file for complete search history.

(56) References Cited

U.S. PATENT DOCUMENTS

| | | | |
|---|---|---|---|
| 4,963,418 | A | 10/1990 | Isaka et al. |
| 7,001,651 | B2 | 2/2006 | Hayakawa et al. |
| 7,128,863 | B2 | 10/2006 | Kim et al. |
| 8,329,828 | B2 * | 12/2012 | Endo et al. .................... 525/444 |
| 2009/0270584 | A1 | 10/2009 | Endo et al. |
| 2010/0247845 | A1 | 9/2010 | Haruta et al. |
| 2010/0256309 | A1 | 10/2010 | Endo et al. |
| 2010/0260951 | A1 | 10/2010 | Haruta et al. |

FOREIGN PATENT DOCUMENTS

| | | |
|---|---|---|
| EP | 0 097 108 A1 | 6/1983 |
| EP | 1 577 116 A1 | 9/2005 |
| EP | 2258538 A1 | 12/2010 |
| JP | 62-032028 A | 2/1987 |
| JP | 08-034838 A | 2/1996 |
| JP | 09-239833 A | 9/1997 |
| JP | 2002-332394 A | 11/2002 |
| JP | 2003-170498 A | 6/2003 |
| JP | 2004-142126 A | 5/2004 |
| JP | 2005-171127 A | 6/2005 |
| JP | 2007-016120 A | 1/2007 |
| JP | 2007-056156 A | 3/2007 |
| JP | 2007-203652 A | 8/2007 |
| JP | 2009-073145 A | 4/2009 |
| JP | 2009-163195 A | 7/2009 |
| JP | 2009-202445 A | 9/2009 |
| JP | 2009-226940 A | 10/2009 |
| WO | WO 99/62982 A1 | 12/1999 |
| WO | 2009/075333 A1 | 6/2009 |
| WO | 2009/107591 A1 | 9/2009 |

OTHER PUBLICATIONS

Japanese Patent Office, International Search Report in International Patent Application No. PCT/JP2011/056163 (Jun. 14, 2011) English translation.
European Patent Office, Extended European Search Report in European Patent Application No. 08858428.9 (Oct. 14, 2011).
State Intellectual Property Office of People's Republic of China, First Office Action in Chinese Patent Application No. 200880120547.8 (Jul. 24, 2012) English translation.
Japanese Patent Office, International Search Report in International Patent Application No. PCT/JP2008/072541 (Mar. 17, 2009) English translation.
European Patent Office, Extended European Search Report in European Patent Application No. 11765337.8 (Mar. 17, 2014).

* cited by examiner

*Primary Examiner* — Walter B Aughenbaugh
(74) *Attorney, Agent, or Firm* — Leydig, Voit & Mayer, Ltd.

(57) ABSTRACT

Disclosed is a heat shrinkable polyester film formed from a polyester resin that is mainly composed of ethylene terephthalate and contains 3-12% by mole (inclusive) of one or more monomer components, which can be amorphous components, relative to all the polyester resin components, in which the heat shrinkable polyester film has a main shrinkage direction which is the width direction. The heat shrinkable polyester film is characterized in that the shrinkage in 80° C. glycerin, the shrinkage in 130° C. glycerin and the tensile breaking strength in the longitudinal direction are controlled within specific ranges.

6 Claims, No Drawings

HEAT SHRINKABLE POLYESTER FILM, METHOD FOR PRODUCING SAME, AND PACKAGED BODY

CROSS-REFERENCE TO RELATED APPLICATIONS

This patent application is the U.S. national phase of International Patent Application No. PCT/JP2011/056163, filed Mar. 16, 2011, which claims the benefit of Japanese Patent Application No. 2010-089346, filed Apr. 8, 2010, which are incorporated by reference in their entireties.

TECHNICAL FIELD

The present invention relates to a heat shrinkable polyester film, a method for producing of a heat shrinkable polyester film, and packaged body, specifically relates to a heat shrinkable polyester film suitable a label application, a method for producing of a heat shrinkable polyester film, and packaged body using the label.

BACKGROUND ART

Recently, in applications such as label package doubling as a protection of a glass bottle and a PET bottle etc. and display of articles, cap sealing and accumulation package, there have been widely used drawn films (so-called heat shrinkable films) composed of a polyvinyl chloride resin, a polystyrene resin, a polyethylene resin or the like. Of these heat shrinkable films, a polyvinyl chloride film has problems that heat resistance is low, and it generates hydrogen chloride gas in incineration and causes dioxin. A polystyrene film has problems that it is inferior in chemical resistance, as well as an ink with a special composition needs to be used in printing, it requires high temperature incineration and generates a lot of black smoke accompanied by an abnormal odor. Therefore, as a shrink label, there has been widely used a polyester-based heat shrinkable film which is high in heat resistance, easy to incinerate, and excellent in chemical resistance, and the use amount tends to increase being accompanied by an increase in turn volume of PET containers.

Further, as a heat shrinkable film, a film is generally utilized which greatly shrinks in the width direction in terms of handleability in label production. Hence, the conventional heat shrinkable polyester film has been produced by drawing at a high ratio in the width direction in order to exhibit a sufficient shrinkage force in the width direction at heating.

However, in the summer season, when the temperature is high, if a heat shrinkable polyester film is stored in an outside storehouse where the temperature is not controlled, there is a problem in that the phenomenon of film shrinkage (so-called natural shrinkage) occurs, reducing the product width. In addition, similarly, in the case of storage in a storehouse where the temperature is high, there is a problem in that the shrinkage in the main shrinkage direction decreases, and, when the film is cut into a label and attached on a container or the like by heat shrinkage, it is not possible to perform attachment beautifully and efficiently unless the temperature conditions for heat shrinkage are changed. Therefore, a heat shrinkable polyester film is usually stored under low-temperature conditions at a temperature of 25° C. or less. However, in terms of delivery, cost, and recent environment, storage at a low temperature in the summer season or the like is undesirable.

PRIOR ART DOCUMENT

Patent Document

Patent document 1: Japanese Unexamined Patent Publication No. SHO 62-32028

DISCLOSURE OF THE INVENTION

Problem to be Solved by the Invention

The present invention is to solve the problems of conventional heat shrinkable polyester films mentioned above, and provide a heat shrinkable polyester film which, even if stored in an outside storehouse where the temperature is not controlled in the summer season when the temperature is high, does not occur the phenomenon of film shrinkage (so-called natural shrinkage) and also occurs little reduction in shrinkage in the main shrinkage direction, making it possible to perform attachment beautifully and efficiently without changing the temperature conditions for heat shrinkage when the film is attached on a container or the like as a label by heat shrinkage.

The present inventors keenly studied to solve the above-described problems and as a result, they completed the present invention at last. That is, the present invention is configured as follows.

Means for Solving the Problem

1. A heat shrinkable polyester film made of a polyester resin comprising ethylene terephthalate as a main constituent and containing 3% by mole or more and 12% by mol or less of at least one monomer capable of forming an amorphous component in the whole components of the polyester resin, the heat shrinkable polyester film satisfying the following requirements (1) to (4):

(1) glycerin shrinkage in the longitudinal direction and the width direction is 2% or less when being treated in glycerin at 80° C. for 10 seconds;

(2) glycerin shrinkage in the longitudinal direction is 0% or more and 10% or less when being treated in glycerin at 130° C. for 10 seconds;

(3) glycerin shrinkage in the width direction is 25% or more and 60% or less when being treated in glycerin at 130° C. for 10 seconds; and (4) tensile breaking strength in the longitudinal direction is 50 MPa or more and 130 MPa or less.

2. The heat shrinkable polyester film described in the first, wherein the film has a shrinkage in the width direction of 1% or less after aging for 672 hours in an atmosphere having a temperature of 60° C. and a relative humidity of 40% (so-called natural shrinkage).

3. The heat shrinkable polyester film described in the first or second, wherein when a film after aging for 672 hours in an atmosphere having a temperature of 60° C. and a relative humidity of 40% is treated in glycerin at 90° C., 100° C., 110° C., 120° C., and 130° C. for 10 seconds, the shrinkages in the width direction thereof are different from the shrinkages of the film before aging at the same temperature and under the same conditions, the difference being 5% or less.

4. The heat shrinkable polyester film described in any one of the first to third, wherein the number of initial breakages is 7 or less, the number of initial breakages being the number of breakages that occur until 5% tensioning when, after aging for 672 hours in an atmosphere having a temperature of 60° C. and a relative humidity of 40%, a tensile test is performed 10 times in the film longitudinal direction at a chuck-to-chuck distance of 20 mm using a tensile tester.

5. A packaged body, wherein the heat shrinkable polyester film described in any one of the first to forth is used as a base material, and a label provided with perforations or a pair of notch is coated on at least a part of the outer circumference and heat-shrunk.

6. A method for continuously producing of the heat shrinkable polyester film described in any one of the first to forth, comprising the following steps (a) to (e):

(a) a lengthwise drawing step for drawing an undrawn film to 1.2 times or more and 1.8 times or less in the longitudinal direction at a temperature of 75° C. or more and 100° C. or less;

(b) an intermediate heat treatment step for heat-treating the film after the lengthwise drawing at a temperature of 130° C. or more and 150° C. or less for 10 seconds or more and 40 seconds or less in a state that both edges in the width direction are held by clips in a tenter;

(c) a forced cooling step for positively cooling the film after the intermediate heat treatment to a surface temperature of 100° C. or more and 120° C. or less;

(d) a transverse drawing step for drawing the film after the forced cooling to 3.5 times or more and 5.0 times or less in the width direction at a temperature of 90° C. or more and 110° C. or less; and (e) a final heat treatment step for heat-treating the film after the transverse drawing at a temperature that is at least 5° C. and up to 20° C. higher than the temperature of drawing in the width direction for 5.0 seconds or more and 15.0 seconds or less in a state that both edges in the width direction are held by clips in a tenter.

Effects of the Invention

The heat shrinkable polyester film of the present invention undergoes little change in film physical properties after aging for a long period of time in an environment like summer, and storage under low-temperature conditions is not required. In addition, the shrinkability in the width direction, which is the main shrinkage direction, is high, and also the mechanical strength in the longitudinal direction orthogonal to the width direction is high. Therefore, stiffness (so-called "bend" strength) is high, and thus attachability as a label is excellent. In addition, the processabilites in printing and tubing are excellent. Therefore, the heat shrinkable polyester film of the present invention can be suitably used as a label of a container such as bottles. When used as a label, it can be attached on a container such as bottles extremely efficiently and beautifully within a short time.

MODE FOR CARRYING OUT THE INVENTION

The polyester used in the present invention is a polyester whose main constituent is ethylene terephthalate. Namely, it contains 50% by mole or more, preferably 60% by mole or more of ethylene terephthalate. Dicarboxylic acid components constituent the polyester of the present invention can include aromatic dicarboxylic acids such as isophthalic acid, naphthalenedicarboxylic acid and ortho-phthalic acid; aliphatic dicarboxylic acids such as adipic acid, azelaic acid, sebacic acid and decanedicarboxylic acid; and alicyclic dicarboxylic acid.

In the case of containing the aliphatic dicarboxylic acids (for example, adipic acid, sebacic acid and decanedicarboxylic acid etc.), the content is preferably less than 3% by mole.

A heat shrinkable polyester film obtained by using a polyester that contains 3% by mole or more of these aliphatic dicarboxylic acids may be insufficient in film stiffness at high-speed attachment, and, therefore, it is not preferable.

Further, it is preferable not to contain polybasic carboxylic acids of tribasic or more (for example, trimellitic acid, pyromellitic acid and anhydride thereof etc.). A heat shrinkable polyester film obtained by using a polyester containing these polybasic carboxylic acids is hard to achieve a desired high shrinkage.

Diol components constitute the polyester used in the present invention include aliphatic diols such as ethylene glycol, 1,3-propanediol, 1,4-butanediol, neopentyl glycol and hexanediol; alicyclic diols such as 1,4-cyclohexanedimethanol; and aromatic diols such as bisphenol A.

The polyester used in the heat shrinkable polyester film of the present invention is preferably a polyester containing one kind or more of cyclic diols such as 1,4-cyclohexanedimethanol and diols having carbon 3 to 6 carbon atoms (for example, 1,3-propanediol, 1,4-butanediol, neopentyl glycol and hexanediol etc.) and adjusting a glass transition point (Tg) in 60 to 80° C. The polyester is more preferably a polyester containing 1,3-propanediol or 1,4-butanediol and adjusting Tg in the above-mentioned range. The polyester is particularly preferably a polyester mixed in the form of polytetramethylene terephthalate polymer or polybutylene terephthalate polymer, and adjusting Tg in the above-mentioned range.

Further, the polyester used for the heat shrinkable polyester film of the present invention preferably has 3% by mole or more and 12% by mole or less of the sum of at least one monomer capable of forming an amorphous component in 100% by mole of the polyhydric alcohol component or in 100% by mole of the polybasic carboxylic acid component in the whole polyester resin, more preferably 5% by mole or more and 10% by mole or less. Here, as a monomer capable of forming an amorphous component, for example, there can be listed neopentyl glycol, 1,4-cyclohexanedimethanol, isophthalic acid, 1,4-cyclohexanedicarboxylic acid, 2,6-naphthalenedicarboxylic acid, 2,2-diethyl-1,3-propanediol, 2-n-butyl-2-ethyl-1,3-propanediol, 2,2-isopropyl-1,3-propanediol, 2,2-di-n-butyl-1,3-propanediol, 1,4-butanediol and hexanediol, and among these, neopentyl glycol, 1,4-cyclohexanedimethanol or isophthalic acid is preferably used.

In a polyester used in the heat shrinkable polyester film of the present invention, it is preferable not to contain diols having 8 or more carbon atoms (for example, octanediol etc.) or polyhydric alcohols of trihydric or more (for example, trimethylolpropane, trimethylolethane, glycerin, diglycerin etc.). A heat shrinkable polyester film obtained by using polyester containing these diols or polyhydric alcohols is hard to achieve a desired high shrinkage.

Further, in the polyester used in the heat shrinkable polyester film of the present invention, it is preferable not to contain diethylene glycol, triethylene glycol and polyethylene glycol as far as possible. Particularly, diethylene glycol is a by-product component at polyester polymerization and therefore easy to exist, but in the polyester for use in the present invention, the content of diethylene glycol is preferably less than 4% by mole.

To a resin for forming the heat shrinkable polyester film of the present invention, according to needs, there can be added various additives, such as waxes, an antioxidant, an antistatic agent, a crystal-nucleation agent, a viscosity reducing agent, a heat stabilizer, a pigment for coloring, a color protection agent, and an ultraviolet absorber. By adding fine particles as lubricant to a resin for forming the heat shrinkable polyester film of the present invention, it is preferable to make workability (slipperiness) of the polyethyleneterephthalate-based resin film better. The fine particles can be arbitrarily selected, for example, as inorganic fine particles, silica, alumina, titanium dioxide, calcium carbonate, kaolin, barium sulfate and the like can be listed. As organic fine particles, for example, an acrylic resin particle, a melamine resin particle, a silicone resin particle, a crosslinked polystyrene particle and the like can be listed. The average particle diameter of the fine particles is in a range of 0.05 to 3.0 μm (when measured by coulter counter), and it can be suitably selected according to need.

As a method for compounding the above-described particles in a resin for forming the heat shrinkable polyester film, for example, they can be added in an arbitrary step in production of the polyester resin, but they are preferably added in a step of esterification, or in a step before start of polycondensation reaction after completion of ester exchange reaction as slurry dispersed in ethylene glycol etc., followed by carrying out polycondensation reaction. Further, it is also preferably carried out by a method in which slurry of particles dispersed in ethylene glycol, water or the like and raw materials of polyester resin are mixed using a kneading extruder with a vent, or a method in which dried particles and raw materials of polyester resin are mixed using a kneading extruder.

Putting the above descriptions together, it can be said that a particularly preferred polyester in the present invention is a mixed polyester obtained by mixing (A) an ordinary polyethylene terephthalate polymer, (B) a polyethylene terephthalate polymer containing a lubricant such as silica, (C) a polyester copolymer obtained by copolymerizing polyethylene terephthalate as a base with neopentyl glycol, 1,4-cyclohexanedimethanol, or isophthalic acid, and optionally (D) a polyester polymer formed of a polytrimethylene terephthalate polymer or a polybutylene terephthalate polymer for adjusting the Tg of the whole. Because (A) and (B) are mixed, the mixed polyester contains a lubricant such as silica in an amount of 100 to 2000 ppm. Because (C) is mixed, the mixed polyester contains a constituent unit made of neopentyl glycol, 1,4-cyclohexanedimethanol, or isophthalic acid and ethylene glycol in an amount of 3% by mole or more and 12% by mole or less, more preferable 5% by mole or more and 10% by mole or less, based on the entire mixed polyester. Because (D) is optionally mixed, the mixed polyester has a Tg adjusted to 60 to 80° C.

Furthermore, it is also possible to conduct corona treatment, coating treatment, frame treatment etc. on the heat shrinkable polyester film of the present invention in order to enhance adhesiveness of film surface.

In the heat shrinkable polyester film of the present invention, when it is treated for 10 seconds under no-load condition in glycerin heated to 80° C., heat shrinkage (namely, glycerin heat shrinkage at 80° C.) in the width direction and the longitudinal direction of the film calculated from the following Equation 1, is preferable 2% or less from the lengths before and after shrinkage.

Heat shrinkage={(length before shrinkage−length after shrinkage)/length before shrinkage}×100 (%)    Equation 1

A high decrease in heat shrinkage as measured before and after aging means a strong influence of aging, which is not preferable. That is, provided that the aging temperature is 60° C., if the glycerin heat shrinkage at 80° C., i.e. aging temperature+20° C., is more than 2%, the glycerin heat shrinkage at 80° C. after aging decreases, and a difference in shrinkage before and after aging increases, which is not preferable. Therefore, the upper limit of the glycerin heat shrinkage at 80° C. in the film longitudinal and width direction is preferably not more than 2%, more preferably not more than 1%. When the glycerin heat shrinkage at 80° C. in the film longitudinal and width direction is not less than 2%, the film is once elongated during shrinkage, and therefore shrinkage finish properties are deteriorated, which is not preferable. Thus, the lower limit of the glycerin heat shrinkage at 80° C. in the film width direction is preferably not less than −2%, more preferably not less than −1%, furthermore preferably not less than 0%.

Further, the heat shrinkage of the film in the longitudinal direction calculated by the above Equation 1 from lengths before and after shrinkage when the heat shrinkable polyester film of the present invention is treated for 10 seconds under no-load conditions in glycerin heated to 130° C. (namely, glycerin heat shrinkage at 130° C.) is preferably not less than 0% and not more than 10%.

When the glycerin heat shrinkage at 130° C. in the longitudinal direction is less than 0% (namely, the shrinkage is a negative value), satisfactory shrinkage appearance is difficult to obtain when the film is used as a label for a bottle, thus being not preferable. Conversely, if the heat shrinkage rate at 130° C. in the longitudinal direction is more than 10%, strains easily occur in shrinkage at heat shrinkage when the film is used as a label, thus being not preferable. The lower limit of the heat shrinkage at 130° C. in the longitudinal direction is more preferably not less than 1%, furthermore preferably not less than 2%, and particularly preferably not less than 3%. The upper limit of the glycerin heat shrinkage at 130° C. in the longitudinal direction is more preferably not more than 9%, furthermore preferably not more than 8%, and particularly preferably not more than 7%.

Further, the heat shrinkage of the film width direction calculated by the above Equation 1 from lengths before and after shrinkage when the heat shrinkable polyester film of the present invention is treated for 10 seconds under no-load conditions in glycerin heated to 130° C. (namely, glycerin heat shrinkage at 130° C.) is preferably not less than 25% and not more than 60%.

When the glycerin heat shrinkage at 130° C. in the width direction is less than 25%, since the amount of shrinkage is small, it is not preferable because wrinkle and sag generate on a label after heat shrinkage. Conversely, if the glycerin heat shrinkage at 130° C. in the width direction is more than 60%, strain in shrinkage at heat shrinkage tends to occur when used as a label, or so-called "jumping up" may be generated, and therefore the case is not preferred. The lower limit of the glycerin heat shrinkage at 130° C. in the width direction is more preferably not less than 28%, furthermore preferably not less than 31%, and particularly preferably not less than 34%. The upper limit of the glycerin heat shrinkage at 130° C. in the width direction is more preferably not more than 57%, furthermore preferably not more than 54%, and particularly preferably not more than 51%.

In the heat shrinkable polyester film of the present invention, when tensile breaking strength in the longitudinal direction is obtained by the following method, the tensile breaking strength needs to be 50 MPa or more and 130 MPa or less.

[Measuring Method of Tensile Breaking Strength]

A rectangular specimen with a predetermined size is produced in accordance with JIS-K-7113, both edges of the specimen are held by a universal tensile tester and a tensile test was carried out in a condition of 200 mm/min in tensile speed, strength (stress) at tensile break in the longitudinal direction of film is calculated as tensile breaking strength.

When the tensile breaking strength in the longitudinal direction is less than 50 MPa, it is not preferable because stiffness becomes weak when attached on a bottle etc. as a label. The lower limit of the tensile breaking strength is more preferably 60 MPa or more, furthermore preferably 70 MPa or more and particularly preferably 80 MPa or more. The higher the upper limit of the tensile breaking strength, the more preferable because the bend strength increases, but it is believed that the upper limit of the tensile breaking strength is not more than 130 MPa from the viewpoint of raw materials and a production process.

Further, in the heat shrinkable polyester film of the present invention, the shrinkage in the film width direction after aging for 672 hours at a temperature of 60° C. and a relative humidity of 40% (so-called natural shrinkage rate) is preferably not more than 1% when determined by the following method.

[Method for Measurement of Natural Shrinkage]

A film is sampled in a length of 20 mm in the film longitudinal direction and 240 mm in the film width direction, and marked with lines such that the length in the film width direction is 200 mm. The length between the lines is designated as a length (mm) before aging. The film is aged for 672 hours in a geer oven set at a temperature of 60° C. and a relative humidity of 40%, followed by determining the natural shrinkage from the following Equation 2 with the length between the lines designated as a length (mm) after aging.

Natural shrinkage={(length before aging−length after aging)/length before aging}×100%  Equation 2

When the natural shrinkage in the width direction is more than 1%, the film product width after storage is different from that just after production, and the dimension varies in a processing step such as printing, thus being not preferable. The upper limit of the natural shrinkage is more preferably not more than 0.9%, furthermore preferably not more than 0.8%, and particularly preferably not more than 0.7%. The lower limit of the natural shrinkage rate is preferably 0%, but is believed to be not less than 0.2% from the viewpoint of the raw materials and production process.

In addition, it is also preferable that in the case where the heat shrinkable polyester film of the present invention is treated under no-load conditions for 10 seconds in heated glycerin at 90° C., 100° C., 110° C., 120° C., and 130° C., the shrinkages in the film width direction calculated by the above Equation 1 are such that when a difference before and after aging for 672 hours at a temperature of 60° C. and a relative humidity of 40% is determined as follows, the differences at respective treatment temperatures are all 5% or less.

[Method for Measuring Difference in Heat Shrinkage Before and after Aging]

Using the above Equation 1, the heat shrinkage of a film in the film width direction before and after aging in glycerin at each predetermined temperature was measured. It was calculated using the following Equation 3.

Difference in heat shrinkage before and after aging (%)=heat shrinkage before aging (%)−heat shrinkage after aging (%)  Equation 3

When the difference in heat shrinkage in the width direction before and after aging is more than 5%, the difference in heat shrinkage between the film immediately after the production and the film after storage is large. Accordingly, the temperature conditions for heat shrinkage upon the attachment of a label on a container is different between the two, and the shrinkage finish properties lack unity and deteriorate; therefore, this is undesirable. The upper limit of the difference in heat shrinkage in the width direction before and after aging is more preferably 4.5% or less, furthermore preferably 4% or less, and particularly preferably 3.5% or less. In addition, although the lower limit of the difference in heat shrinkage in the width direction before and after aging is preferably 0%, in terms of the raw materials and a production process, it is believed that 2% is the limit.

In addition, in the heat shrinkable polyester film of the present invention, it is preferable that the number of initial breakages in the film longitudinal direction after aging for 672 hours at a temperature of 60° C. and a relative humidity of 40% is 7 or less out of 10.

[Method for Measuring Number of Initial Breakages]

From a film after aging, a rectangular sample measuring 60 mm in the longitudinal direction and 20 mm in the width direction was taken. The film was placed in a universal tensile tester, then the both longitudinal ends of the sample were held (chuck holding position on one side: 20 mm, chuck-to-chuck distances: 20 mm), and a tensile test was performed under the following conditions: temperature: 23° C., tensile rate: 200 mm/min. The tensile test was repeated using ten samples. The number of breakages that occurred when the elongation in the film longitudinal direction was 5% or less was determined, and defined as the number of initial breakages.

In the case where the number of initial breakages in the film longitudinal direction after aging is 7 or more, when a film roll after aging is reeled off for printing or the like and tension is applied thereto, it is highly possible that the film breaks, resulting in process abnormalities; therefore, this is undesirable. The upper limit of the number of initial breakages in the longitudinal direction after aging is more preferably 6 or less, furthermore preferably 5 or less, and particularly preferably 4 or less. In addition, although the lower limit of the number of initial breakages is preferably 0, in terms of the raw materials and a production process, it is believed that 2 is the limit.

The thickness of the heat shrinkable polyester film of the present invention is not particularly limited, but 5 μm or more and 200 μm or less is preferable as a heat shrinkable film for a label, and 10 μm or more and 70 μm or less is more preferable.

The production method of the heat shrinkable polyester film of the present invention is not particularly limited, and is described by examples. The heat shrinkable polyester film of the present invention can be obtained from a polyester raw material that has ethylene terephthalate as main constituent and has 3% by mole or more and 12% by mole or less of the sum of at least one monomer capable of forming an amorphous component in the whole polyester resin, and the polyester raw material is melt-extruded by an extruder to form an undrawn film, and the undrawn film is biaxially drawn by a predetermined method shown below and heat-treated.

When a raw material is melt-extruded, it is preferable to dry the polyester raw material using a dryer such as a hopper dryer and a paddle dryer, or a vacuum dryer. After the polyester raw material is dried in such a manner, utilizing an extruder, it is melted at a temperature of 200 to 300° C., and extruded into a film form. In such an extrusion, an arbitrary conventional method such as a T-die method and a tubular method can be adopted.

Then, the sheet-like molten resin after extrusion is quenched to be able to obtain an undrawn film. As a method for quenching the molten resin, a method in which a molten resin is cast on a rotary drum from a die and solidified by quenching to obtain a substantially unoriented resin sheet can be suitably adopted.

The undrawn film obtained is drawn in the longitudinal direction under a predetermined condition as described below, and the film after longitudinally drawing is quenched, and then heat-treated once, the film after the heat treatment is cooled in a predetermined condition, and then drawn in the width direction under a predetermined condition, and heat-treated once again, thereby obtaining a heat shrinkable polyester film of the present invention. Hereinafter, a preferable film forming method to obtain a heat shrinkable polyester film of the present invention is described in detail by considering the difference from the film forming method of the conventional heat shrinkable polyester film.

[A Method for Producing a Heat Shrinkable Polyester Film of the Present Invention]

As described above, a conventional heat shrinkable polyester film can be produced by drawing an undrawn film only in a direction to be shrunk (namely, main shrinkage direction, ordinarily width direction). The present inventors have studied on the conventional production method, and as a result, it has been found that there are the following problems in production of the conventional heat shrinkable polyester film.

In the case of simply drawing in the width direction, as described above, mechanical strength in the longitudinal direction becomes small, stiffness as a label become low. In addition, it is difficult to increase a line speed of a film forming equipment.

In the case of adopting a method of drawing in the longitudinal direction after drawing in the width direction, using any drawing condition cannot sufficiently exhibit shrinkage force in the width direction. Furthermore, it exhibits shrinkage force in the longitudinal direction at the same time, so that finishing after being shrunk and attached as a label becomes bad.

In the case of adopting a method of drawing in the width direction after drawing in the longitudinal direction, although it can exhibit shrinkage force in the width direction, it exhibits shrinkage force in the longitudinal direction at the same time, so that finishing after being shrunk and attached as a label becomes bad.

Further, based on the problems in the production of conventional heat shrinkable polyester films mentioned above, the present inventors have conducted a further study on a heat shrinkable polyester film having excellent physical property retention after aging at a temperature of 60° C. and a relative humidity of 40% and also having high productivity. As a result, they have found the following.

It is believed that in order to reduce a decrease in film heat shrinkage after aging, it is necessary to use raw materials and film-forming conditions such that the initial heat shrinkage at a temperature up to 20° C. higher than the aging temperature is close to zero and that heat shrinkage starts at a temperature more than 20° C. higher than the aging temperature.

It is believed that in order to achieve excellent initial breakage after aging, it is necessary that molecules oriented in the longitudinal direction remain to some extent.

In order for finishing after shrinkage-attachment as a label to be good, it is preferable not to exhibit shrinkage force in the longitudinal direction, therefore it is considered that the state of tension of molecules oriented in the longitudinal direction need to be canceled out.

Then, the present inventors have reached a conclusion that in order to satisfy good film properties after aging and finish properties after shrinkage simultaneously from the above-described knowledge, "molecules not contributed to shrinkage force while being oriented in the longitudinal direction" need to be present in a film. Then, they have paid attention on how to carry out drawing in order for "molecules not contributed to shrinkage force while being oriented in the longitudinal direction" to be able to be present in a film and had a trial and error. As a result, they have reached the present invention based on the following: drawing is carried out in the width direction after drawing is carried out in the longitudinal direction, what is called, in production of a film by a lengthwise-transverse drawing method, by conducting the following means, "molecules not contributed to shrinkage force while being oriented in the longitudinal direction" to be present in a film can be realized, thereby to obtain a heat shrinkable polyester film satisfying good perforation-tear property and finish properties after shrinkage at the same time.

(1) Control of lengthwise drawing condition
(2) Intermediate heat treatment after lengthwise drawing
(3) Forced cooling after intermediate heat treatment
(4) Control of transverse drawing condition Hereinafter, each means described above is described sequentially.

(1) Control of Lengthwise Drawing Conditions

In the production of a film by the lengthwise-transverse drawing method of the present invention, in order to obtain a film roll of the present invention, it is preferable to conduct the lengthwise drawing at a relatively low ratio of not less than 1.2 times and not more than 1.8 times in a substantially single lengthwise drawing step at a temperature of not less than 75° C. and not more than 100° C.

When drawing temperature is less than 75° C., orientation in the lengthwise direction becomes too high, breakage tends to occur in transverse drawing in the next step, and it is not preferable. On the other hand, when drawing temperature is more than 100° C., film melts and bonds to a drawing roll, and drawing becomes difficult, and it is not preferable. By the lengthwise drawing at a low ratio as described above, it becomes possible to control the degree of orientation and the tension of molecules in the longitudinal and width directions of the film in the intermediate heat-setting, transverse drawing and final heat treatment to be described later, and consequently to make longitudinal direction mechanical properties of the final film better. When the drawing ratio in the lengthwise drawing is less than 1.1 times, the merits of conducting the lengthwise drawing is substantially not obtained and the mechanical properties in the longitudinal direction becomes insufficiently, and it is not preferable. When the drawing ratio in the lengthwise drawing is less than 1.2 times, there is also a tendency that the number of initial breakages increases and furthermore, it is difficult to increase the line speed of the film-making equipment. When the drawing ratio of the lengthwise drawing exceeds 1.8 times, although favorable data are obtained as to the mechanical properties in the longitudinal direction and the number of initial breakages, the shrinkage in the longitudinal direction tends to become large, which is not preferable.

The irregularity of thickness in the lengthwise direction increases as the drawing ratio in the lengthwise direction increases. According to the studies by the present inventors, the irregularity of thickness becomes maximum at about 2.5 times and thereafter tends to decrease. That is, by setting the drawing ratio of the lengthwise drawing at a relatively low ratio of 1.2 to 1.8 times, an effect of decreasing the irregularity of thickness in the lengthwise direction can be obtained.

(2) Intermediate Heat Treatment after Lengthwise Drawing

As described above, in order for "molecules not contributed to shrinkage force while being oriented in the longitudinal direction" to be present in a film, it is preferable to thermally relax molecules oriented in the longitudinal direction, but conventionally, in biaxial drawing of a film, between the first-axial drawing and the second-axial drawing, when a film is subjected to heat treatment at high temperature, the film is crystallized after heat treatment, so that the film cannot be drawn more, this fact was the technical common knowledge in the art. However, the present inventors have had a trial and error, and as a result, a surprising fact has been found out as follows; in a lengthwise-transverse drawing method, lengthwise drawing is conducted in a certain constant condition, an intermediate heat treatment is conducted in a predetermined condition with adjusting to the state of the film after the lengthwise drawing, and furthermore, with adjusting to the state of the film after the intermediate heat setting, transverse drawing is conducted in a predetermined condition, thereby without causing breakage in the transverse drawing, to be able to make "molecules not contributed to shrinkage force while being oriented in the longitudinal direction" present in the film.

Namely, in the production of the film of the present invention by a lengthwise-transverse drawing method, after an undrawn film is lengthwisely drawn, under a state that both edges in the width direction are held by clips in a tenter, it is preferably to conduct heat treatment (hereinafter called intermediate heat treatment) at a temperature of 130° C. or more and 150° C. or less for 10 seconds or more and 40 seconds or less. By conducting such intermediate heat treatment, it becomes possible that "molecules not contributed to shrinkage force while being oriented in the longitudinal direction" can be present in a film. Even in the case where any lengthwise drawing is conducted, "molecules not contributed to shrinkage force while being oriented in the longitudinal direction" cannot be necessarily to be present in a film, but by conducting the foregoing predetermined lengthwise drawing, it becomes possible that "molecules not contributed to shrinkage force while being oriented in the longitudinal direction" can be present in a film for the first time after intermediate heat treatment. Then, by conducting the following forced cooling and transverse drawing, it becomes possible to orient molecules to the width direction and exhibit shrinkage force in the width direction while maintaining "molecules not contributed to shrinkage force while being oriented in the longitudinal direction."

The temperature of the intermediate heat treatment is preferably not less than 130° C. and not more than 150° C. When the lower limit of the temperature of the intermediate heat treatment is less than 130° C., it is not preferable because the shrinkage force in the longitudinal direction remains, and the shrinkage in the longitudinal direction of the film after being drawn in the transverse direction becomes high. When the upper limit of the temperature of the intermediate heat treatment is more than 150° C., it is not preferable because the surface layer of the film is roughened and transparency becomes bad.

The time of the intermediate heat treatment is preferably not less than 10 seconds and not more than 40 seconds. Although the intermediate heat treatment can be performed at a lower temperature in the case of performing the treatment for a time longer than 40 seconds, the productivity is lowered. When the treatment time is less than 10 seconds, it is not preferable because the shrinkage force in the longitudinal direction of the film remains, and the shrinkage in the longitudinal direction of the film after being drawn in the transverse direction becomes high.

Further, in conducting the intermediate heat treatment as described above, it is preferable to adjust conditions of intermediate heat treatment such that heat shrinkage stress in the longitudinal direction of the film after intermediate heat treatment is 0.5 MPa or less. By conducting the intermediate heat treatment in such a predetermined condition, it becomes possible to control degree of orientation in the longitudinal and width directions of the film and degree of tension of molecule in transverse drawing and final heat treatment.

(3) Forced Cooling of the Film after Intermediate Heat Treatment

In production of a film by the lengthwise-transverse drawing method of the present invention, as described above, the film after intermediate heat treatment is not transversely drawn as it is, but it is preferable that a temperature of the film is quenched to be 100° C. or more and 120° C. or less. In quenching a film, when the temperature of the film after quenching keeps exceeding 120° C., shrinkage in the width direction of the film becomes low and shrinkage becomes insufficient as a label. In addition, in quenching a film, when the temperature of the film after quenching keeps continues less than 100° C., stress of drawing becomes large, breakage of the film tends to occur.

(4) Control of Transverse Drawing Condition

In production of a film by the lengthwise-transverse drawing method of the present invention, it is preferable to transversely drawing a film in a predetermined condition after lengthwise drawing, intermediate heat treatment and quenching. Namely, the transverse drawing is preferably carried out such that the ratio becomes 3.5 times or more and 5.0 times or less at 90° C. or more and 110° C. or less, in a state that both edges in the width direction are held by clips in a tenter. By conducting the transverse drawing in such a predetermined condition, it becomes possible to orient molecules to the width direction and exhibit shrinkage force in the width direction while maintaining "molecules not contributed to shrinkage force while being oriented in the longitudinal direction" formed by lengthwise drawing and intermediate heat treatment, from which it becomes possible to obtain a film in which longitudinal direction mechanical properties are good as a label.

When the drawing temperature is more than 110° C., the shrinkage in the width direction is likely to decrease, and the irregularity of thickness tends to be high at the same time; therefore, this is undesirable. Meanwhile, when the drawing temperature is less than 90° C., the orientation in the width direction is too high, whereby the film is likely to break during transverse drawing, or the heat shrinkage at 80° C. in the film width direction increases; therefore, this is undesirable. Incidentally, when the draw ratio is less than 3.5, the film is not uniformly drawn in the width direction, the irregularity of thickness generates, this is undesirable. Meanwhile, when the draw ratio is more than 5.0, the orientation in the width direction is too high, and the film is likely to break during drawing; therefore, this is undesirable.

It is preferable that after the film is transversely drawn, the film is heat-treated at a temperature that is at least 5° C. and up to 20° C. higher than the temperature of drawing in the transverse direction for 5 seconds or more and 15 seconds or less in a state that both edges in the width direction are held by clips in a tenter. When the heat treatment is performed at a temperature more than 20° C. higher than the temperature of drawing in the transverse direction, the heat shrinkage in the width direction decreases; therefore, this is undesirable. In addition, although the heat treatment is usually performed under tension in a fixed state, it is also possible to perform 20% or less relaxation or width increase at the same time.

During the drawing mentioned above, it is also possible that a corona treatment is applied to one or both sides of the film before or after drawing to improve the adhesion of the film to a printing layer and/or an adhesive layer, etc.

In addition, during the drawing method mentioned above, it is also possible that a coating is applied to one or both sides of the film before or after drawing to improve the adhesion, mold-release property, antistatic property, lubricity, light-blocking property, and the like of the film.

The packaged body of the present invention is used the foregoing heat shrinkable polyester film as a base material, and as an object of the packaged body, to start with PET bottles for beverage, various kinds of bottles and cans, plastic containers for confectionary or lunch bag etc., paper box and the like can be listed (hereinafter, these are collectively referred to as a packaging object). In general, in the case where a label using a heat shrinkable polyester film as a base material is coated on the packaging object and heat-shrunk, the label is heat-shrunk by about 2 to 15% and closely attached on the packaged body. Additionally, a label coated on a packaging object may be printed or may not be printed.

In addition, as a recent response to environment, packaging objects are often discarded after peeling the label off. Therefore, in order for the label to be easily peeled off, it is also possible that the label is perforated or notched, and then the label in the following tube form, for example, is heat-shrunk about 2 to 15% and thereby brought into close attach with the packaged body.

A method for producing a label is as follows; an organic solvent is applied on the inside slightly from the end part of one surface of a rectangular film, the film is immediately rounded to stack the end parts and bonded into a label-form, or an organic solvent is applied on the inside slightly from the end part of one surface of a film wound as a roll, the film is immediately rounded to stack the end parts and bonded into a tube-form, which is cut into a label. As the organic solvent for bonding, cyclic ethers such as 1,3-dioxolan and tetrahydrofuran are preferable. Besides, there can be used aromatic hydrocarbons such as benzene, toluene, xylene and trimethylbenzene; halogenated hydrocarbons such as methylene chloride and chloroform; phenols such as phenol, or a mixture thereof.

EXAMPLES

Hereinafter, the present invention will be described in further detail through examples. However, the present invention is not limited these examples within the scope thereof.

Evaluation methods using in the present invention are as follows.

[Heat Shrinkage (Glycerin Heat Shrinkage)]

A film was cut into a square of 10 cm×10 cm, treated and heat-shrunk in no load state for 10 seconds in glycerin heated to a predetermined temperature±0.5° C., and then the dimensions of the film in the lengthwise and transverse directions were measured, and heat shrinkage each was obtained according to the following Equation 1. The direction with the larger heat shrinkage was defined as a main shrinkage direction.

Heat shrinkage={(length before shrinkage−length after shrinkage)/length before shrinkage}×100 (%)  Equation 1

[Heat Shrinkage after Aging (Glycerin Heat Shrinkage)]

A film sample measuring 20 cm in the longitudinal direction and 30 cm in the width direction was aged for 672 hours in a geer aging oven set at a temperature of 60° C. and a relative humidity of 40%. Subsequently, two 10 cm×10 cm square films were cut from the aged film. The films were then treated in glycerin heated to the predetermined temperature±0.5° C. under no-load conditions for 10 seconds and thus heat-shrunk. After that, the dimension of each film in the lengthwise and transverse directions was measured, and heat shrinkage was determined using the above Equation 1.

[Measuring Method of Tensile Breaking Strength]

A rectangular specimen with a predetermined size is produced in accordance with JIS-K-7113, both edges of the specimen are held by a universal tensile tester and a tensile test was carried out in a condition of 200 mm/min in tensile speed, strength (stress) at tensile break in the longitudinal direction of film is calculated as tensile breaking strength.

[Method for Measurement of Natural Shrinkage]

A film is sampled in a length of 20 mm in the film longitudinal direction and 240 mm in the film width direction, and marked with lines such that the length in the film width direction is 200 mm. The length between the lines is designated as a length (mm) before aging. The film is aged for 672 hours in a geer oven set at a temperature of 60° C. and a relative humidity of 40%, followed by determining the natural shrinkage from the following Equation 2 with the length between the lines designated as a length (mm) after aging.

Natural shrinkage={(length before aging−length after aging)/length before aging}×100%  Equation 2

[Method for Measuring Difference in Heat Shrinkage Before and after Aging]

Using the above Equation 1, the heat shrinkage of a film in the film width direction before and after ageing in glycerin at each predetermined temperature was measured. It was calculated using the following Equation 3.

Difference in heat shrinkage before and after aging (%)=heat shrinkage before aging (%)−heat shrinkage after aging (%)  Equation 3

[Number of Initial Breakages]

A film sample cut in a length of 20 cm in the longitudinal direction and 30 cm in the width direction was aged for 672 hours in a geer oven set at a temperature of 60° C. and a relative humidity of 40%. Thereafter, ten pieces of samples were cut in a length of 60 mm in the original longitudinal direction and 20 mm in the width direction from one 20 cm×30 cm aged sample. The film was placed in a universal tensile tester, then the both longitudinal ends of the sample were held (each chuck holding position on one side: 20 mm, chuck-to-chuck distances: 20 mm), and a tensile test was performed under the following conditions: temperature: 23° C., tensile rate: 200 mm/min. The tensile test was repeated using ten samples. The number of breakages that occurred when the elongation in the film longitudinal direction was 5% or less was determined, and defined as the number of initial breakages.

[Tg (Glass Transition Point)]

Using a differential scanning calorimeter manufactured by Seiko Instruments Inc. (model: DSC220), 5 mg of an undrawn film was heated at a heating-up speed of 10° C./min from −40° C. to 120° C., Tg (glass transition point) was obtained from the thus obtained endothermic curve. Tangent lines were drawn in front of and behind the inflection point of the endothermic curve, and the intersection was defined as Tg.

Properties and compositions of polyester resins used in Examples and Comparative Examples, and production conditions of films in Examples and Comparative Examples ware shown in Table 1 and 2 respectively.

<Preparation of Polyester Raw Material>

100 mol % of dimethyl terephthalate (DMT) as a dibasic acid component and 100 mol % of ethylene glycol (EG) as a glycol component were placed in a stainless steel autoclave equipped with a stirrer, a thermometer and a partially circulating cooler such that the amount of glycol was 2.2 times the amount of methyl ester in terms of the molar ratio, and an ester exchange reaction was carried out using 0.05 mol % (based on the acid component) of zinc acetate as an ester exchange catalyst while distilling away generated methanol to outside the system. Thereafter, 0.025 mol % (based on the acid component) of antimony trioxide was added as a polycondensation catalyst, and a polycondensation reaction was carried at 280° C. under a reduced pressure of 26.6 (0.2 torr) to obtain polyester (A) having an intrinsic viscosity of 0.70 dl/g. This polyester is polyethylene terephthalate. In production of the polyester (A), $SiO_2$ (Silysia 266 manufactured by FUJI SILYSIA CHEMICAL LTD.) was added as a lubricant in a ratio of 8000 ppm based on polyester. Polyesters (B and C) shown in Table 1 were synthesized by the same process as described above. In the table, NPG is neopentyl glycol. The intrinsic viscosities of polyesters B and C were 0.72 dl/g and 0.72 dl/g, respectively. Each polyester was appropriately formed into a chip.

TABLE 1

| | Raw material composition of polyester (mol %) | | | | |
|---|---|---|---|---|---|
| | Dicarboxylic acid component | Polyhydric alcohol component | | | Added amount of lubricant |
| | DMT | EG | NPG | CHDM | (ppm) |
| Polyester A | 100 | 100 | — | — | 8000 |
| Polyester B | 100 | 100 | — | — | 0 |
| Polyester C | 100 | 70 | 30 | — | 0 |
| Polyester D | 100 | 70 | — | 30 | 0 |

The thus obtained undrawn film was introduced into a lengthwise drawing machine in which a plurality of rolls were sequentially installed, and drawn in the lengthwise direction using the difference in rotation speeds between the rolls. That is, the undrawn film was preheated on a preheating roll till the film temperature reached 85° C., and then lengthwisely drawn by 1.5 times using the difference in rotation speeds between a low-speed rotating roll whose surface temperature was set at 85° C. and a high-speed rotating roll whose surface temperature was set at 30° C.

Thereafter, the lengthwisely drawn film was intermediate heat-treated at 140° C. and a wind speed of 18 m/s for 10 seconds in a state that the both ends in the width direction are held by clips, introduced into a cooling zone, and cooled positively by blowing low-temperature wind till the surface temperature of the film reached 100° C. The film after cooling was introduced into a transverse drawing zone, and drawn at 95° C. by 4.0 times in the width direction (transverse direction).

Thereafter, the transversely drawn film was introduced into a final heat treatment zone in the tenter in a state that the both ends in the width direction are held by clips, and heat-treated at a temperature of 100° C. for 5 seconds in the final heat treatment zone. The film was then cooled, both ends were removed by cutting, and the film having a width of 500 mm and a thickness of about 30 μm was wound in a roll, thereby to continuously produce a biaxially drawn film of about 30

TABLE 2

| | | | Drawing conditions | | | | | | |
|---|---|---|---|---|---|---|---|---|---|
| | | Monomer content of amorphous component (mol %) | Lengthwise drawing step | | Intermediate heat treatment | | Film surface temperature after forced cooling step (° C.) | Transverse drawing step | | Temperature of final heat treatment (° C.) |
| | Resin composition | | Temperature of preheating (° C.) | Draw ratio | Temperature (° C.) | Time (sec.) | | Drawing temperature (° C.) | Draw ratio | |
| Example 1 | A/B/C = 5/75/20 | 6 | 85 | 1.5 | 140 | 10 | 100 | 95 | 4 | 100 |
| Example 2 | A/B/C = 5/75/20 | 6 | 85 | 1.8 | 140 | 10 | 100 | 95 | 4 | 100 |
| Example 3 | A/B/C = 5/75/20 | 6 | 85 | 1.2 | 140 | 10 | 100 | 95 | 4 | 100 |
| Example 4 | A/B/C = 5/75/20 | 6 | 85 | 1.5 | 150 | 10 | 100 | 95 | 4 | 100 |
| Example 5 | A/B/C = 5/60/35 | 10.5 | 85 | 1.5 | 140 | 10 | 100 | 95 | 4 | 100 |
| Example 6 | A/B/D = 5/75/20 | 6 | 85 | 1.5 | 140 | 10 | 100 | 95 | 4 | 100 |
| Example 7 | A/B/C = 5/80/15 | 4.5 | 85 | 1.5 | 140 | 10 | 100 | 95 | 4 | 100 |
| Example 8 | A/B/C = 5/75/20 | 6 | 85 | 1.5 | 140 | 10 | 120 | 95 | 4 | 100 |
| Example 9 | A/B/C = 5/75/20 | 6 | 85 | 1.5 | 140 | 10 | 100 | 95 | 4 | 110 |
| Comparative Example 1 | A/B/C = 5/40/55 | 16.5 | 85 | 1.5 | 140 | 10 | 100 | 95 | 4 | 100 |
| Comparative Example 2 | A/B = 5/95 | 0 | 85 | 1.5 | 140 | 10 | 100 | 95 | 4 | 100 |
| Comparative Example 3 | A/B/C = 5/75/20 | 6 | None | | 110 | 10 | 100 | 95 | 4 | 100 |
| Comparative Example 4 | A/B/C = 5/75/20 | 6 | 85 | 1.5 | 120 | 10 | 100 | 95 | 4 | 100 |
| Comparative Example 5 | A/B/C = 5/75/20 | 6 | 85 | 1.5 | 140 | 10 | 100 | 95 | 4 | 90 |
| Comparative Example 6 | A/B/C = 5/75/20 | 6 | 85 | 1.5 | 140 | 10 | 90 | 95 | 4 | 100 |

Example 1

Polyester A, polyester B and Polyester C as described above were mixed in the weight ratio of 5:75:20 and the mixed resin was introduced into an extruder. Thereafter, the mixed resin was molten at 280° C. and extruded from a T-die and then quenched by winding it around a rotating metal roll set at a surface temperature of 30° C. An undrawn film with a thickness of 180 μm was obtained. The take-off speed (rotational speed of the metal roll) of the undrawn film at this time was about 20 m/min. Tg of the undrawn film was 75° C.

μm. The properties of the film obtained were evaluated by the foregoing method. The evaluation results are shown in Tables 3 and 4. The desired properties were achieved, and the results were excellent, showing little change in physical properties after aging.

Example 2

A biaxially drawn film having a width of 500 mm and a thickness of about 30 μm was continuously produced by the same manner as in Example 1 except that the thickness of the undrawn film was changed to 216 μm and the drawing ratio in the lengthwise drawing step was changed to 1.8 times. The properties of the film obtained were evaluated by the foregoing method. The evaluation results are shown in Tables 3 and 4. The obtained film had a number of initial breakages fewer than that of Example 1, and satisfactory results were shown.

Example 3

A biaxially drawn film having a width of 500 mm and a thickness of about 30 μm was continuously produced by the same manner as in Example 1 except that the thickness of the undrawn film was changed to 144 μm and the drawing ratio in the lengthwise drawing step was changed to 1.2 times. The properties of the film obtained were evaluated by the foregoing method. The evaluation results are shown in Tables 3 and 4. Although a number of initial breakages of the resulting film was larger than in Example 1, the number was not problematic, and satisfactory results were shown.

Example 4

A biaxially drawn film having a width of 500 mm and a thickness of about 30 μm was continuously produced by the same manner as in Example 1 except that the temperature of intermediate heat treatment was changed to 150° C. The properties of the film obtained were evaluated by the foregoing method. The evaluation results are shown in Tables 3 and 4. The obtained film had a heat shrinkage in the longitudinal direction lower than that of Example 1, and a difference in heat shrinkage before and after aging smaller than that of Example 1, and satisfactory results were shown.

Example 5

A biaxially drawn film having a width of 500 mm and a thickness of about 30 μm was continuously produced by the same manner as in Example 1 except that Polyester A, polyester B and Polyester C as described above were mixed in the weight ratio of 5:60:35 and the mixed resin was introduced into an extruder. Tg of the undrawn film was 73° C. The properties of the film obtained were evaluated by the foregoing method. The evaluation results are shown in Tables 3 and 4. The obtained film had a heat shrinkage in the width direction higher than that of Example 1, and a difference in heat shrinkage before and after aging larger than that of Example 1, but comprehensively, satisfactory results were shown.

Example 6

A biaxially drawn film having a width of 500 mm and a thickness of about 30 μm was continuously produced by the same manner as in Example 1 except that Polyester C in Example 1 was changed Polyester D. Tg of the undrawn film was 74° C. The properties of the film obtained were evaluated by the foregoing method. The evaluation results are shown in Tables 3 and 4. The obtained film was comparable to Example 1, and satisfactory results were shown.

Example 7

A biaxially drawn film having a width of 500 mm and a thickness of about 30 μm was continuously produced by the same manner as in Example 1 except that Polyester A, polyester B and Polyester C as described above were mixed in the weight ratio of 5:80:15 and the mixed resin was introduced into an extruder. Tg of the undrawn film was 76° C. The properties of the film obtained were evaluated by the foregoing method. The evaluation results are shown in Tables 3 and 4. The obtained film had a heat shrinkage in the width direction lower than that of Example 1, and a difference in heat shrinkage before and after aging was comparable to Example 1, and satisfactory results were shown.

Example 8

In Example 1, an experiment was conducted by the same manner as in Example 1 except that the film surface temperature after intermediate heat treatment was changed 120° C. The obtained film had heat shrinkages in the longitudinal and width direction lower than that of Example 1, and a number of initial breakages larger than that of Example 1, but satisfactory results were shown similar to Example 1.

Example 9

In Example 1, an experiment was conducted by the same manner as in Example 1 except that the temperature of final heat treatment step was changed 110° C. (drawing temperature+15° C.). The obtained film had a shrinkage in the width direction lower than that of Example 1, and a natural shrinkage in the width direction after aging, but satisfactory results were shown similar to Example 1.

Comparative Example 1

A biaxially drawn film having a width of 500 mm and a thickness of about 30 μm was continuously produced by the same manner as in Example 1 except that Polyester A, polyester B and Polyester C as described above were mixed in the weight ratio of 5:40:55 and the mixed resin was introduced into an extruder. The properties of the film obtained were evaluated by the foregoing method. The evaluation results are shown in Tables 3 and 4. The obtained film had a heat shrinkage in the width direction higher than that of Example 1. Specially, heat shrinkages at 80° C. and 90° C. were high, a decrease of heat shrinkage after aging at 80° C., 90° C. and 100° C. became large. Natural shrinkage was high, and undesirable results were shown.

Comparative Example 2

A biaxially drawn film having a width of 500 mm and a thickness of about 30 μm was continuously produced by the same manner as in Example 1 except that Polyester A and polyester B as described above were mixed in the weight ratio of 5:95 and the mixed resin was introduced into an extruder. The properties of the film obtained were evaluated by the foregoing method. The evaluation results are shown in Tables 3 and 4. The obtained film had a heat shrinkage in the longitudinal direction lower than that of Example 1.

Comparative Example 3

A biaxially drawn film having a width of 500 mm and a thickness of about 30 μm was continuously produced by the same manner as in Example 1 except that the thickness of the undrawn film was changed to 120 μm, without lengthwise drawing and the temperature of an intermediate heat treatment was changed to 110° C. The properties of the film obtained were evaluated by the foregoing method. The evaluation results are shown in Tables 3 and 4. The obtained film had a tensile breaking strength in the longitudinal direction lower than that of Example 1, a number of initial breakages lager than that of Example 1, and undesirable results were shown

Comparative Example 4

In Example 1, an experiment was conducted by the same manner as in Example 1 except that the temperature of an intermediate heat treatment was changed 120° C. The obtained film had a shrinkage in the longitudinal direction higher than that of Example 1, and undesirable results were shown.

Comparative Example 5

In Example 1, an experiment was conducted by the same manner as in Example 1 except that the temperature of a final heat treatment was changed 90° C. The obtained film had a heat shrinkage in the width direction at 80° C. higher than that of Example 1, a difference in heat shrinkages before and after aging, and undesirable results were shown.

Comparative Example 6

In Example 1, an experiment was conducted by the same manner as in Example 1 except that the film surface temperature after intermediate heat treatment was changed 90° C. The obtained film had heat shrinkages in the longitudinal and width direction higher than that of Example 1. A difference in shrinkage after aging was 5% or more, a natural shrinkage was high, and undesirable results were shown.

TABLE 3

Properties of heat shrinkable film

| | Heat shrinkage before aging | | | | | | |
|---|---|---|---|---|---|---|---|
| | Longitudinal direction | | Width direction | | | | |
| | 80° C. | 130° C. | 80° C. | 90° C. | 100° C. | 110° C. | 120° C. | 130° C. |
| Example 1 | 0 | 5 | 0 | 3 | 9 | 15 | 24 | 34 |
| Example 2 | 1 | 9 | 0 | 4 | 11 | 17 | 26 | 36 |
| Example 3 | 0 | 4 | 0 | 2 | 7 | 13 | 23 | 32 |
| Example 4 | 0 | 3 | 0 | 1 | 6 | 12 | 21 | 32 |
| Example 5 | 1 | 7 | 1 | 8 | 15 | 25 | 33 | 42 |
| Example 6 | 0 | 4 | 0 | 5 | 10 | 15 | 25 | 35 |
| Example 7 | 0 | 6 | 0 | 1 | 6 | 11 | 20 | 28 |
| Example 8 | 0 | 3 | 0 | 0 | 6 | 11 | 20 | 29 |
| Example 9 | 0 | 4 | 0 | 0 | 4 | 13 | 22 | 33 |
| Comparative Example 1 | 1 | 10 | 32 | 39 | 48 | 54 | 61 | 66 |
| Comparative Example 2 | 0 | 2 | 0 | 2 | 4 | 7 | 12 | 16 |
| Comparative Example 3 | 0 | 3 | 0 | 2 | 7 | 12 | 21 | 31 |
| Comparative Example 4 | 4 | 17 | 1 | 2 | 8 | 15 | 24 | 34 |
| Comparative Example 5 | 1 | 7 | 6 | 11 | 15 | 24 | 33 | 42 |
| Comparative Example 6 | 2 | 8 | 4 | 8 | 15 | 22 | 29 | 40 |

| | Heat shrinkage after aging | | | | | | |
|---|---|---|---|---|---|---|---|
| | Longitudinal direction | | Width direction | | | | |
| | 80° C. | 130° C. | 80° C. | 90° C. | 100° C. | 110° C. | 120° C. | 130° C. |
| Example 1 | 0 | 4 | 0 | 1 | 7 | 14 | 23 | 33 |
| Example 2 | 0 | 7 | 0 | 2 | 9 | 16 | 25 | 35 |
| Example 3 | 0 | 3 | 0 | 1 | 4 | 10 | 21 | 30 |
| Example 4 | 0 | 2 | 0 | 0 | 4 | 11 | 20 | 32 |
| Example 5 | 0 | 5 | 0 | 4 | 11 | 22 | 31 | 41 |
| Example 6 | 0 | 4 | 0 | 1 | 8 | 15 | 24 | 34 |
| Example 7 | 0 | 6 | 0 | 0 | 4 | 10 | 19 | 27 |
| Example 8 | 0 | 3 | 0 | 0 | 4 | 9 | 18 | 27 |
| Example 9 | 0 | 4 | 0 | 0 | 3 | 12 | 22 | 33 |
| Comparative Example 1 | 0 | 12 | 21 | 25 | 42 | 50 | 56 | 63 |
| Comparative Example 2 | 0 | 2 | 0 | 2 | 4 | 6 | 11 | 15 |
| Comparative Example 3 | 0 | 2 | 0 | 1 | 2 | 9 | 19 | 29 |
| Comparative Example 4 | 3 | 14 | 0 | 0 | 6 | 13 | 22 | 33 |
| Comparative Example 5 | 1 | 6 | 0 | 1 | 10 | 20 | 29 | 38 |
| Comparative Example 6 | 2 | 7 | 0 | 3 | 8 | 17 | 25 | 35 |

TABLE 4

| | Difference of heat shrinkage before and after aging Width direction | | | | | | Tensile breaking strength in the longitudinal direction before aging (MPa) | Natural shrinkage in the width direction after aging (%) | Number of initial breakages in the longitudinal direction after aging |
|---|---|---|---|---|---|---|---|---|---|
| | 80° C. | 90° C. | 100° C. | 110° C. | 120° C. | 130° C. | | | |
| Example 1 | 0 | 2 | 2 | 1 | 1 | 1 | 70 | 0.80 | 3/10 |
| Example 2 | 0 | 2 | 2 | 1 | 1 | 1 | 100 | 0.60 | 1/10 |
| Example 3 | 0 | 1 | 3 | 3 | 2 | 2 | 55 | 1.00 | 4/10 |
| Example 4 | 0 | 1 | 2 | 1 | 1 | 0 | 65 | 0.75 | 3/10 |
| Example 5 | 1 | 4 | 4 | 3 | 2 | 1 | 55 | 1.00 | 5/10 |
| Example 6 | 0 | 4 | 2 | 0 | 1 | 1 | 67 | 0.90 | 4/10 |
| Example 7 | 0 | 1 | 2 | 1 | 1 | 1 | 70 | 0.70 | 3/10 |
| Example 8 | 0 | 0 | 2 | 2 | 2 | 2 | 63 | 0.80 | 5/10 |
| Example 9 | 0 | 0 | 1 | 1 | 0 | 0 | 65 | 0.60 | 4/10 |
| Comparative Example 1 | 11 | 14 | 6 | 4 | 5 | 3 | 55 | 1.50 | 3/10 |
| Comparative Example 2 | 0 | 0 | 0 | 1 | 1 | 1 | 80 | 0.10 | 1/10 |
| Comparative Example 3 | 0 | 1 | 5 | 3 | 2 | 2 | 40 | 1.00 | 10/10 |
| Comparative Example 4 | 1 | 2 | 2 | 2 | 2 | 1 | 68 | 0.88 | 3/10 |
| Comparative Example 5 | 6 | 10 | 5 | 4 | 4 | 4 | 71 | 1.00 | 3/10 |
| Comparative Example 6 | 4 | 5 | 7 | 7 | 4 | 5 | 75 | 1.10 | 2/10 |

INDUSTRIAL APPLICABILITY

The heat shrinkable polyester film of the present invention has excellent properties after aging as describe above, thus it can be used suitably as a label application for bottles.

The invention claimed is:

1. A heat shrinkable polyester film made of a polyester resin comprising 50% by mole or more of ethylene terephthalate and containing 3% to 12% by mol of at least one monomer capable of forming an amorphous component in the whole components of the polyester resin,
    wherein the heat shrinkable polyester film has a main shrinkage direction which is the width direction, and
    wherein the heat shrinkable polyester film satisfies the following requirements (1) to (4):
    (1) glycerin shrinkage in the longitudinal direction and the width direction is 2% or less when being treated in glycerin at 80° C. for 10 seconds;
    (2) glycerin shrinkage in the longitudinal direction is 0% or more and 10% or less when being treated in glycerin at 130° C. for 10 seconds;
    (3) glycerin shrinkage in the width direction is 25% or more and 60% or less when being treated in glycerin at 130° C. for 10 seconds; and
    (4) tensile breaking strength in the longitudinal direction is 50 MPa or more and 130 MPa or less.

2. The heat shrinkable polyester film of claim 1, wherein the film has a shrinkage in the width direction of 1% or less after aging for 672 hours in an atmosphere having a temperature of 60° C. and a relative humidity of 40% (so-called natural shrinkage).

3. The heat shrinkable polyester film of claim 1, wherein when a film after aging for 672 hours in an atmosphere having a temperature of 60° C. and a relative humidity of 40% is treated in glycerin at each of the following temperatures 90° C., 100° C., 110° C., 120° C., and 130° C. for 10 seconds, the shrinkages in the width direction thereof are different from the shrinkages of the film before aging at the same temperature and under the same conditions, the difference being 5% or less.

4. The heat shrinkable polyester film of claim 1, wherein the number of initial breakages is 7 or less,
    the number of initial breakages being the number of breakages that occur until 5% tensioning when, after aging for 672 hours in an atmosphere having a temperature of 60° C. and a relative humidity of 40%, a tensile test is performed 10 times in the film longitudinal direction at a chuck-to-chuck distance of 20 mm using a tensile tester.

5. A packaged body comprising a body and a label, wherein the heat shrinkable polyester film of claim 1 is used as a base material for the label, and wherein the label (i) contains perforations or a pair of notches for peelability and (ii) is heat shrunk onto at least a part of the outer circumference of the body.

6. A method for continuously producing the heat shrinkable polyester film of claim 1, comprising the following steps (a) to (e):
    (a) a lengthwise drawing step for drawing an undrawn film to 1.2 times or more and 1.8 times or less in the longitudinal direction at a temperature of 75° C. or more and 100° C. or less;
    (b) an intermediate heat treatment step for heat-treating the film after the lengthwise drawing at a temperature of 130° C. or more and 150° C. or less for 10 seconds or more and 40 seconds or less in a state that both edges in the width direction are held by clips in a tenter;
    (c) a forced cooling step for positively cooling the film after the intermediate heat treatment to a surface temperature of 100° C. or more and 120° C. or less;
    (d) a transverse drawing step for drawing the film after the forced cooling to 3.5 times or more and 5.0 times or less in the width direction at a temperature of 90° C. or more and 110° C. or less; and
    (e) a final heat treatment step for heat-treating the film after the transverse drawing at a temperature that is at least 5° C. and up to 20° C. higher than the temperature of drawing in the width direction for 5.0 seconds or more and 15.0 seconds or less in a state that both edges in the width direction are held by clips in a tenter.

* * * * *